Figure 1:
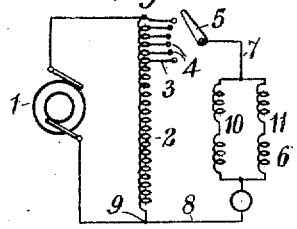

B. G. LAMME.
METHOD OF OPERATING AND CONTROLLING SINGLE PHASE ALTERNATING CURRENT MOTORS.
APPLICATION FILED JULY 9, 1906.

964,793. Patented July 19, 1910.

WITNESSES:
C. L. Belcher
Otto S. Schairer

INVENTOR
Benjamin G. Lamme
BY
Arley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF OPERATING AND CONTROLLING SINGLE-PHASE ALTERNATING-CURRENT MOTORS.

964,793. Specification of Letters Patent. Patented July 19, 1910.

Original application filed May 3, 1904, Serial No. 206,182. Divided and this application filed July 9, 1906.
Serial No. 325,312.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Methods of Operating and Controlling Single-Phase Alternating-Current Motors, of which the following is a specification, this application being a division of my application Serial No. 206,182, filed May 3, 1904.

My invention relates to single-phase, alternating current motors of the commutator type of construction, and it has for its object to provide a method of operating the same whereby a given starting torque may be obtained with a minimum apparent power input thereto.

In the operation of single-phase, alternating current motors having commutators and series-connected armature and field magnet windings, speed variation is commonly obtained by means of a variation of the voltage supplied thereto. Various means have been devised for varying the voltage, such as induction regulators, which comprise primary and secondary windings the inductive relations of which to each other are variable, transformers in which the active length or lengths of one or both windings may be varied and even devices for rheostatic and series-parallel control of the motors.

When a single-phase, series motor is started, just sufficient voltage is applied to its terminals to develop the required torque, the current supplied thereto being largely magnetizing and the power factor being very low. When starting, the apparent power input to the motor will generally be much smaller than the rated power input to the motor at normal speed for the same torque, but as the torque required at start may be considerably greater than the normal running torque, the required apparent power input at start may be almost as great, at times, as the rated power input to the motor, and this apparent power input to the motor will be at a low power factor, representing a difficult load for the supply system to carry.

The apparent power input to single-phase, series motors which are required to start under heavy loads is represented largely by the product of the current in the motor by the voltage across the terminals of the field winding, or, in other words, this apparent power input at start is required principally for the field excitation. The torque of such a motor is represented by the product of the current in the armature and the strength of the field magnetization, the latter being approximately proportional to the ampere turns in the field magnet winding. When starting a motor, there is a slight difference of potential between the terminals of the armature winding necessary to overcome its resistance, but it has been found that the apparent power input to the armature will, in general, be much less than the apparent input to the field magnet under this condition.

Part of the input to the armature is wattless, but this component will, in general, be much less than the wattless component to the field magnet winding. If, therefore, the wattless component in the field magnet winding can be decreased and the current in the armature increased, the total wattless input to the motor may be decreased for a given torque. The wattless component in the field magnet winding may be decreased by decreasing the ampere turns in the field, which also decreases the strength of the field magnetization and increases the armature current for a given torque, the wattless component of the input to the armature being slightly increased thereby.

It is evident that a point may be reached where the ampere turns in the field magnet winding and, consequently, also the strength of the field magnetization, will be decreased so much that a further decrease in the wattless component of the power input to the motor for field excitation will just equal the increase in the wattless component of the power input to the armature. When this point is reached, there is no further gain in decreasing the ampere turns in the field magnet winding for a given starting torque.

In general, it has been found that the ampere turns in the field magnet winding corresponding to a certain torque with least apparent power input to the motor at start will be considerably less than the ampere turns desired for operating the motor at full speed. That is, if the field of the motor is sufficiently weakened to give the desired starting torque with least apparent power input, it will usually be much too weak for the most desirable running conditions as regards commutation. This is true because a motor will commutate better at slow speeds with a weak field than at high speeds. Therefore, for the best relations of starting, it is desirable that the ampere turns in the field magnet winding be decreased and the ampere turns in the armature winding be increased over those desirable for normal running conditions.

The method of operating alternating current motors which has just been explained, and which constitutes the subject-matter of the present application, may be practiced by means that are illustrated in the accompanying drawings, Figures 1 to 12 of which are diagrams of as many different combinations and arrangements of apparatus and circuits.

In Fig. 1, single-phase, alternating current energy is supplied from a suitable source 1 to a transformer winding 2, a portion of which is subdivided by means of leads 3 provided, respectively, with contact terminals 4 with which an arm 5 is adapted to engage. The terminals of the motor 6 are respectively connected between the conductors 7 and 8, which connect, respectively, with the arm 5 and the terminal 9 of the transformer winding 2, the speed of the motor being regulated by adjusting the position of the arm 5. The field magnet winding of the motor 6 is divided into two portions 10 and 11, which are shown as connected in parallel for starting conditions or when the lower voltages are applied to the motor. These two portions 10 and 11 may correspond to the number of field magnet poles in the motor, or each portion may include more than one magnet pole winding.

Figure 2:
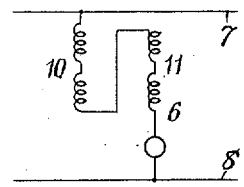

In Fig. 2, the two portions 10 and 11 of the field magnet winding are connected in series, this being for running conditions of the motor, or when the higher voltages are applied thereto. Since the resistance of the field magnet winding is small, the currents therein, and consequently the number of ampere turns, depend largely upon the number of turns in series. Then for starting conditions, as shown in Fig. 1, the field magnet winding has a smaller number of ampere turns than in Fig. 2; that is, the ratio of the ampere turns in the field magnet winding to those in the armature winding is increased as the speed of the motor increases, in accordance with the desirable conditions previously outlined.

Figure 3:
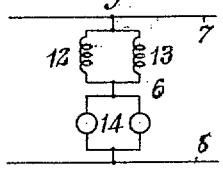
Figure 4:
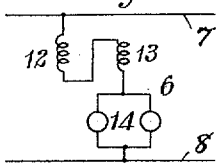
Figure 5:
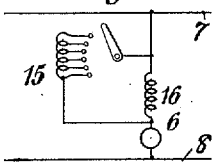

In Figs. 3 and 4, I have shown a similar arrangement for two motors, the field magnet windings 12 and 13 of the two motors being connected in parallel for starting, as shown in Fig. 3, and in series for running, as shown in Fig. 4, the armatures 14 of the motors being always connected either in series or in parallel, as described, though I prefer to connect them in parallel, as shown. It is also possible to vary the amount of current in the field magnet winding by arranging a shunt 15 to the field magnet winding 16, as shown in Fig. 5, the resistance of the shunt being varied as the speed of the motor is changed, it being requisite or desirable that this shunt have approximately the same power factor as the power input to the field magnet windings, or that it be of some other form which will not disturb the phase relations of the currents in the armature and field magnet windings.

While I have shown only one motor arranged with a shunt to its field magnet winding, it is evident that the field magnet windings of two or more motors may be connected either in series or in parallel and a suitable shunt arranged to said windings, the armatures of the motors being connected either in series or in parallel, as desired.

Figure 6:
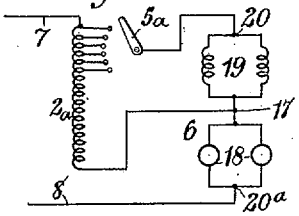
Figure 7:
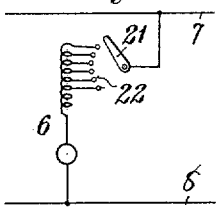

The strength of the field magnetization may be varied by varying the voltage supplied to the field magnet winding, a suitable means for this purpose being shown in Fig. 6, comprising a transformer winding $2^a$ having one terminal connected to the common terminal 17 of the armature or armatures 18 and the field magnet winding or windings 19 of one or more motors 6. An arm $5^a$ is connected to field magnet terminal 20 of the motor or motors 6 for varying the point of connection of the said terminal with the transformer $2^a$. Any other suitable means may be employed for varying the voltage supplied to the field magnet winding within the scope of my invention. The simplest means known to me for varying the ampere turns in the field magnet winding comprises an arm 21 adapted to engage with contact terminals 22 which are respectively connected with suitable points in the field magnet winding, substantially as shown in Fig. 7. It will, of course, be understood in connection with Figs. 2, 3, 4, 5, 6 and 7, that suitable means, such as that shown in Fig. 1, will be employed to effect speed regulation at the same time that the ratio of field to armature ampere-turns is adjusted, it being deemed unnecessary to illustrate such speed regulating means in connection with each of the figures.

Figure 8:
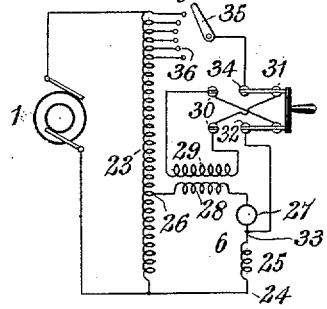

It is often desirable, in the operation of alternating current motors, to transmit energy at high voltages and transform to lower voltages at the point of consumption, systems of this sort being shown in the remaining figures of my drawings, the one in Fig. 8 comprising a suitable source of energy 1 with which the terminals of a main transformer winding 23 are connected, one terminal of the winding 23 being also connected directly to a terminal 24 of the field magnet winding 25 of a motor 6. Connected between a suitable point 26 in the main transformer winding 23 and a terminal of the armature 27 of the motor 6, is a secondary winding 28 of a series transformer the terminals of the primary winding 29 of which are connected, respectively, to terminals 30 of a reversing switch 31. Terminal 32 of the reversing switch 31 is connected to the terminals 33 of the field magnet winding 25 and the armature winding 27, which are connected together, and terminal 34 is connected to an arm 35 which is adapted to make engagement with contact terminals 36 in order to vary the voltage supplied to the primary winding 29.

If the reversing switch is in the position opposite to that shown by full lines, the series transformer serves to reduce the voltage applied by the transformer 23 to the motor, and to return current to the transformer 23 corresponding in amount to the reduction of the motor voltage. That is, the voltage applied to the motor is less than that between the point 26 and the lower extremity of the transformer winding by an amount equal to the drop of potential in the secondary winding 28 of the series transformer. The entire current taken from the transformer 23 passes through the secondary winding 28 and the armature 27, and then divides, a part of it passing through the field magnet winding 25, and the other part returning to the transformer 23 through the primary winding 29 of the series transformer. The latter part is, of course, determined in value by the ratio of transformation of the series transformer, which should be other than unity and such that the current in the secondary winding will be greater than that in the primary winding. From the above explanation, it will be understood that, under this condition, the armature winding carries the entire current, while the field magnet winding carries the difference between the currents in the primary and secondary windings of the series transformer.

If the reversing switch occupies the position shown in full lines, the series transformer serves to increase or boost the voltage applied by the transformer 23 to the motor, with the result that the voltage between the motor terminals is greater than that between the point 26 and the lower extremity of the transformer winding 23, and the motor speed increases. The current which traverses the armature 27 is, of course, again the same as that which traverses the secondary winding 28, but, since the primary winding 29 is now reversed, the field magnet winding 25 is traversed not only by the same current as the armature but also by the current that traverses the primary winding 29 of the series transformer. In this case, therefore, the current in the field magnet winding is the sum of the currents respectively in the armature 27 and the primary winding 29, and the field magnet winding, accordingly, carries a greater current in proportion to the armature current at full voltage than at low voltage, and the ratio of the ampere-turns in the field magnet winding to those in the armature winding is less for starting conditions than for running conditions.

It will, of course, be understood from the foregoing that adjustment of the position of the arm 35 effects regulation of the speed of the motor, and that the reversing switch is employed as auxiliary means for the same purpose, it being thrown to cause the windings 28 and 29 of the series transformer to oppose each other for the lower speeds, and to cause the said windings to assist each other for the higher speeds.

Figure 9:
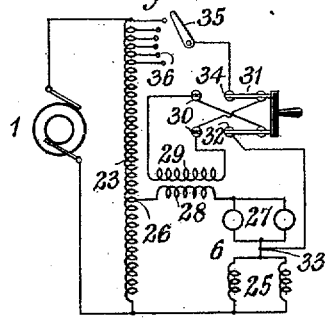
Figure 10:
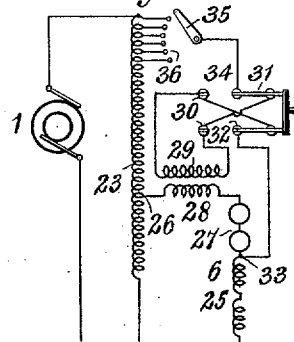

It is evident that the application of the method which is embodied in this system is not limited to what is shown in Fig. 8, but that the armature and field magnet windings of two or more motors may be connected in parallel or in series, as shown, respectively, in Figs. 9 and 10, or that they may be arranged in any other desired or suitable manner.

Figure 11:
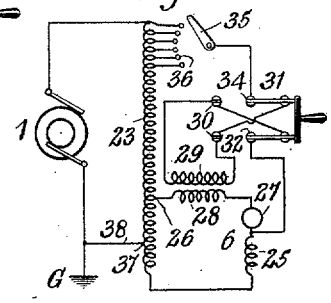

In Fig. 11, I have shown a modification of the systems shown in Figs. 8, 9 and 10, which consists in connecting one terminal of the main transformer winding 23 and an intermediate point 37 thereof, near the other terminal, to the source of energy 1, this arrangement being devised for the purpose of reducing the difference of potential between the terminals of the motor 6 and the conductor 38 which is connected to the point 37 in the main transformer winding 23 and may be grounded at G.

Figure 12:
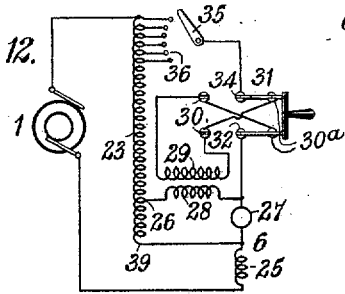

A modification of the system just described is shown in Fig. 12, which consists in connecting the terminal 32 of the reversing switch 31 with one terminal of the secondary winding 28 and with one terminal of the armature 27 and in connecting the field magnet winding 25 between one terminal of the main transformer winding 23 and a terminal of the source of energy 1.

If the reversing switch 31 is in the position opposite to that shown in full lines, the series transformer will have the effect of reducing the voltage applied to the armature 27 to less than that between the points 26 and 39. Only a part, therefore, of the current in the secondary winding 28 traverses the armature 27, the remainder thereof returning to the transformer 23 through the primary winding 29 of the series transformer. The current in the armature is then the difference of the currents respectively in the secondary and primary windings of the series transformer, and since this current is supplied at a relatively low voltage, the apparent power input to the armature is correspondingly low, and will be much less for a given torque than when higher voltages are applied to the armature. As the current in the field magnet winding 25 is the same as the primary current in the auto-transformer winding 23, and since this is dependent in value upon the input to the armature, it is obvious that the field current is also relatively low when low voltages are applied to the armature. With this arrangement, the current in the armature may be made greater for starting conditions than for running conditions without abnormally increasing the apparent power input to the motor, and the required starting torque may be obtained with the minimum apparent power input.

If the reversing switch occupies the position shown in full lines, the series transformer will supplement the voltage applied by the transformer 23 to the armature 27, so that the motor will increase in speed. The current which traverses the armature is then the sum of the currents in the primary and secondary windings of the series transformers. Since the armature current is now supplied at a higher voltage, for a given value thereof, the apparent power input to the armature will be greater than when the reversing switch occupies the position opposite to that shown in full lines. With an increased input to the armature, the primary current in the transformer winding 23 and the current in the field magnet winding 25 are correspondingly increased. For running conditions, therefore, the ampere-turns in the field magnet winding are increased with respect to those in the armature.

From the descriptions and explanations that have been given of Figs. 8 to 12, inclusive, it is seen that the ratio of the ampere turns in the field magnet winding to those in the armature is changed automatically as the voltage applied to the motor, or its speed, is adjusted. As the inductive component of the applied electromotive force is dependent upon the value of the current traversing the motor, with a given current the said inductive component is the same at all speeds and at all applied electromotive forces, providing nothing occurs during the changes of speed and voltage to affect the ratio of the ampere-turns respectively in the field and armature windings. Since, according to the present invention, the said ratio is reduced during starting conditions, it is evident that the inductive component of the applied electromotive force is less under starting conditions than when operating at full speed.

The series transformer in each of Figs. 8 to 12, inclusive, may be replaced, if desired, by any other suitable device, such, for instance, as an induction regulator having primary and secondary windings the inductive relations of which may be adjusted for the purpose of effecting gradual variation of the speed of the motor, as well as gradual changes in the ratio of the field to the armature ampere turns.

Means have heretofore been provided for changing the ratio of the currents in the armature and field magnet windings, but, so far as I am aware, no one has heretofore proposed to adjust the ratio when starting so that a given torque may be exerted with the least apparent power input to the motor, or to increase the ratio of the ampere turns in the field magnet winding to the ampere turns in the armature winding as the speed increases. Nor am I aware that it has been proposed by others, or that it has heretofore been found desirable to decrease the current in the field magnet winding when starting.

While I have shown a number of specific means for changing or increasing the ratio of the ampere turns in the field magnet winding to the ampere turns in the armature winding of a motor as the speed increases, I desire it to be understood that other than these particular means may be employed to practice the invention.

I claim as my invention:

1. The method of regulating an alternating current motor having series-connected armature and field magnet windings which consists in adjusting the speed thereof in a plurality of steps or gradations and in causing the ratio of the ampere-turns in the field magnet winding to the ampere-turns in the armature winding to vary directly as the speed.

2. The method of regulating an alternating current motor having series-connected armature and field magnet windings which consists in adjusting the speed thereof in a plurality of steps or gradations and in causing the ampere-turns in the field magnet winding to increase with increase of speed.

3. The method of regulating an alternating current motor having series-connected armature and field magnet windings which consists in adjusting the speed thereof in a plurality of steps or gradations and in decreasing the ampere-turns in the armature winding with reference to the ampere-turns in the field magnet winding as the speed increases.

4. The method of regulating an alternating current motor having series-connected armature and field magnet windings which consists in adjusting the speed thereof in a plurality of steps or gradations and decreasing the ampere-turns in the field magnet winding and increasing the ampere-turns in the armature winding for starting and at lower speeds over the corresponding values for higher speeds.

5. The method of regulating an alternating current motor having series-connected armature and field magnet windings which consists in supplying variable voltages to the motor as a whole, and at the same time adjusting the ratio of the ampere-turns in the field magnet winding to the ampere-turns in the armature winding in accordance with the speed.

6. The method of regulating an alternating current motor having armature and field magnet windings which consists in supplying variable voltages to the motor as a whole and at the same time increasing the ratio of the ampere-turns in the field magnet winding to those of the armature winding as the speed increases.

7. The method of regulating an alternating current motor having armature and field magnet windings which consists in adjusting the speed thereof in a plurality of steps or gradations and in decreasing the wattless component of the electromotive force applied to the field magnet winding and increasing the current in the armature winding for starting and slow speeds with reference to the corresponding values for higher speeds.

8. The method of regulating an alternating current motor having armature and field magnet windings which consists in adjusting the speed thereof in a plurality of steps or gradations and in decreasing the ampere-turns in the field magnet winding and increasing the ampere-turns in the armature winding for starting and slow speeds with reference to the corresponding values for higher speeds until the inductive component of the applied electromotive force becomes a minimum.

9. The method of regulating an alternating current motor having series-connected armature and field magnet windings which consists in adjusting the speed thereof in a plurality of steps or gradations, in reducing the inductive component of the applied electromotive force under starting conditions by adjusting the ratio of the ampere-turns in the field magnet winding to the ampere-turns in the armature winding, and in changing the said ratio as the speed increases.

10. The method of regulating an alternating current motor having series-connected field magnet and armature windings which consists in adjusting the speed thereof in a plurality of steps or gradations, reducing the ratio of the ampere turns in field magnet winding to those in armature winding when starting so as to obtain the required torque with the least apparent power input to the motor, and in increasing the value of the ratio as the speed increases.

11. The method of regulating electric motors having series-connected field magnet and armature windings which consist in adjusting the speed thereof and in adjusting the circuit arrangements of the field magnet windings with respect to each other to vary the ratio of the ampere-turns in the field magnet windings to those in the armature windings directly as the variations in speed.

In testimony whereof, I have hereunto subscribed my name this 29th day of June, 1906.

BENJ. G. LAMME.

Witnesses:
ELIZ. LIVINGSTONE,
BIRNEY HINES.